United States Patent [19]

McNamara

[11] Patent Number: 4,611,326
[45] Date of Patent: Sep. 9, 1986

[54] CIRCUITRY FOR IDENTIFYING THE VALIDITY OF RECEIVED DATA WORDS

[75] Inventor: John E. McNamara, Maynard, Mass.

[73] Assignee: Digital Equipment Corporation, Maynard, Mass.

[21] Appl. No.: 479,635

[22] Filed: Mar. 28, 1983

[51] Int. Cl.4 ............................................. G06F 13/42
[52] U.S. Cl. ..................................................... 371/47
[58] Field of Search ... 364/200 MS File, 900 MS File; 375/8, 106, 108, 111; 370/103, 94, 100, 105, 106; 371/47; 340/825.14, 825.2, 825.52

[56] References Cited

U.S. PATENT DOCUMENTS

| | | | |
|---|---|---|---|
| 3,472,961 | 10/1969 | Wheeler | 375/108 |
| 3,786,415 | 1/1974 | Phillips et al. | 371/47 |
| 3,938,082 | 2/1976 | Schowe | 371/47 |
| 3,975,712 | 8/1976 | Hepworth | 364/200 |
| 4,071,887 | 1/1978 | Daly | 364/900 |
| 4,106,091 | 8/1978 | Hepworth | 364/200 |
| 4,346,440 | 8/1982 | Kyu | 364/200 |
| 4,370,648 | 1/1983 | Wagner et al. | 370/105 |
| 4,393,464 | 7/1983 | Knapp | 364/200 |

Primary Examiner—James D. Thomas
Assistant Examiner—Florin Munteanu
Attorney, Agent, or Firm—William E. Cleaver

[57] ABSTRACT

A multi-stage modem status register, which has at least one stage which is ordinarily unused, is employed to receive operating condition signals from an associated modem. In addition bistable circuitry, which exists as part of the control circuitry of a transceiver, is used: (1) to provide a first binary signal when a data processor (with which the present system is used), generates a "resynchronization request" signal; and (2) to provide a second binary signal in response to resynchronization being achieved. The bistable circuitry is connected to the above described ordinarily unused stage to enable one or the other of the binary signals to be present. The multi-stage modem status register is regularly interrogated and the results are sent to both a memory and a comparison device. Output signals from the memory are transmitted to said comparison device, at the time that the results of a subsequent interrogation are transmitted to the comparison device. Hence, the operating condition signals from said modem status register, as they appear in two different time frames, are compared. When the modem status register changes its condition status, as indicated by a change of state of the bistable device, the comparison device provides an output signal to distinguish between probable invalid received data words and probable valid received data words.

5 Claims, 1 Drawing Figure

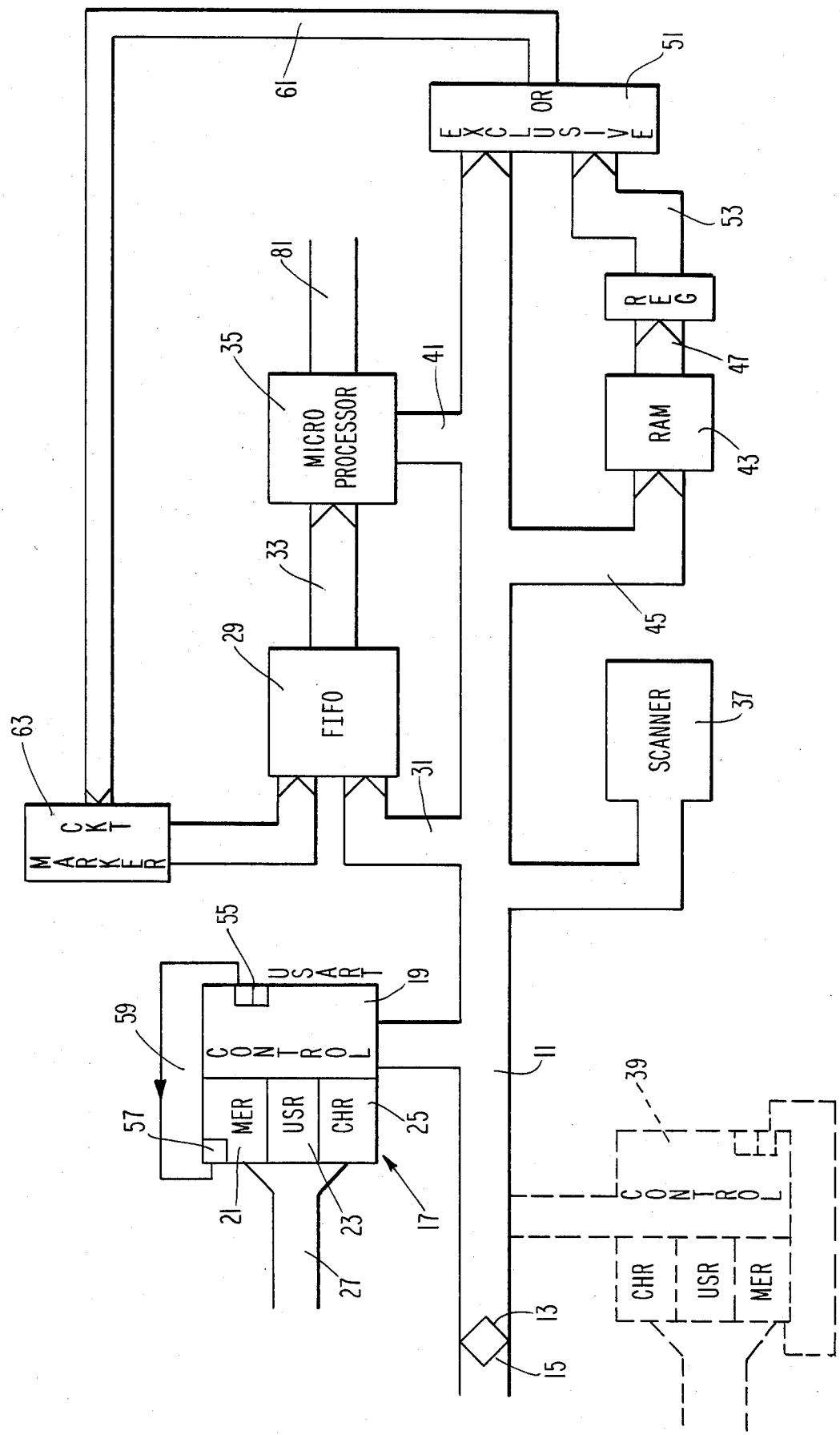

CIRCUITRY FOR IDENTIFYING THE VALIDITY OF RECEIVED DATA WORDS

BACKGROUND OF THE INVENTION

In interface circuits (transceivers) which are used to couple synchronous communication lines to data communication systems, it is the established practice to provide a circuit which examines the received data bits sequentially and searches, or examines, those bits for one or more occurrences of a particular character, referred to as the "SYNC" character. If, for instance, the characters of such a system were composed of eight bits, then the system would be looking for a certain combination of eight bits (a particular arrangement of ONE's and ZERO's) which represents the SYNC character. When the circuitry recognizes such a character, or in some implementations, a pair of such characters, the transceiver is considered to be "in synchronization." Such an "in synchronization" transceiver generates a "receiver active" or "synchronization achieved" signal. Thereafter the transceiver assembles subsequent eight bit sequences as characters and produces a "character ready" flag each time that such an eight bit sequence has been assembled. It has become the practice to use a plurality of terminals in a data communication system and in order to accommodate such a plurality of terminals, it has become the practice to use a "synchronous multiplexer." In a synchronous multiplexer arrangement, it is desirable to have a first-in, first-out (FIFO) buffer into which received characters are stored before being transferred to the data processor within the data communications system.

When data is being received, there is always a concern as to whether or not the bits received, as an eight bit segment, really constitute a character, or, in fact, constitute portions of two charaters. Accordingly, it is common practice to have some form of error checking test, ("cyclic redundancy check"), within the program of the data processor which is used in the data communication system. To say it another way, periodically within a received message, there are characters whose numerical value is the result of a known mathematical function applied to the other characters in the message and which are deliberately placed in the message, usually at the end, by the transmitting device and those characters are examined by the receiving data processor. If, in fact, those characters do not appear in their prearranged form, then the data processor assumes that the message has been subjected to errors, or, if this condition occurs frequently that the message is being sent "out of synchronization" and the data processor is programmed to do something about it. In such circumstances, the programmer has arranged for the data processor to request that the transceiver circuit re-enter the operating mode in which it examined the receiving bits looking for SYNC characters and this is a process which is known in the prior art as "SYNC Search."

When a data processor initiates a SYNC search directed to a particular terminal, there may be data words from that terminal which are stored in the FIFO buffer and which arrived therein subsequent to the arrival of the invalid error checking word which caused the data processor to generate the SYNC search signal. If such data words exist in the FIFO, they are considered not valid by the system and the system must provide a method and a technology to discard such data words. It should also be recognized that data words which are received in the FIFO buffer, after synchronization has been achieved, are considered to be valid characters and should be retained. Further, in a synchronous multiplexer, there may exist in the FIFO buffer valid data words which have been received from terminals other than the one upon which a "SYNC Search" is requested.

In the prior art, complex systems have made it possible for the programmer to generate a marker to be entered into the FIFO at the time a SYNC Search is initiated. The prior art systems further use the occurrence of the SYNC Search condition to cause the data procressor to go into a program routine which searches for the marker so that the system can distinguish between data words received before and after the SYNC search commenced. The prior art structures which provide this capability to the programmer, employ a great deal of logic circuitry to accomplish the generation of the marker and to accomplish the search circuitry looking for the marker. In addition, it has very often happened that a programmer, thinking that one marker would be worthwhile but two markers would be even better, employs a program to provide two markers, only to find that the computer circuitry was designed to search for only one marker. In such circumstances the computer acts on the second marker as though it were a valid word. In other words, in this situation, when two markers are generated at the whim of the programmer, the second marker is received as a valid data word and the message is burdened with an irregularity from that point on.

The present system eliminates the need for complex logic circuitry to enable the data communication systems to know that resynchronization is being sought and secondly, that resynchronization has been achieved.

SUMMARY OF THE INVENTION

The present invention makes use of the features of prior art data processors which are used in data communication systems. Said data processors are programmed to recognize transmission irregularities and are programmed to act in response to send "resynchronization request" signals to control circuitry of a transceiver, which transceiver is used as an interface in such a data communication system. The control circuitry of the transceiver responds to the "resynchronization request" signal and among other steps, examines all incoming data for a pair of SYNC signals. A pair of SYNC signals would be two groups of, for instance, eight bits wherein the particular combination of the eight bits represents intelligence, meaning that system is about to receive data words and the data words are synchronized. The present system uses the resync request signal to clear the bistable device which has been indicating achievement of synchronization within the transceiver and to transmit a binary signal to an ordinarily unused stage of a modem status register. Such modem status registers are normally part of such data communication systems and normally have some unused stages. When resynchronization has been achieved and recognized by the control circuity, the present system uses that electronic determination as indicated by the setting of the "synchronization achieved" flip-flop to pass a second binary signal (indicating resynchronization achieved) to said ordinarily unused stage of the modem status register. Further, the present system regularly interrogates the modem status register to determine the many operational conditions of the modem which is being used. By arranging to compare each modem status register interrogation read out with a previous modem status register interrogation read out, the system can recognize a change in the status of the modem operational conditions and, in particular, can recognize a change from "synchronization achieved" to "synchronization being sought" and vice versa. When such a change is recognized, the present system provides alert signals which are used by the data communication system to recognize that, in fact, resync is being sought and to identify data words entered into the FIFO after resynchronization is achieved.

The features and objects of the present invention will be better understood in view of the following description taken in conjunction with the drawing.

BRIEF DESCRIPTION OF THE DRAWING

The only FIGURE shows a block diagram of a portion of a data communications system which is employing the present invention.

In the drawing, there is shown a data bus 11. The data bus 11 is a plurality of wires representing a plurality of channels and is able to conduct signals in a bidirectional flow, as indicated by the arrowheads 13 and 15. In the preferred embodiment, the data bus is comprised of 16 lines, eight of which represent time multiplexed data and address information (called D/A lines), four of which represent, or carry, control signals, such as data strobe or address strobe, etc., and four more lines which carry parity signals and parity error signals, which are generated at various components, as information is transmitted through the data communication system network. It should be understood that while only one terminal is shown and indicated as transceiver terminal 17, there is normally a plurality of such terminals and the utility of the present invention has greater significance when there is a plurality of terminals as will become apparent hereinafter.

DESCRIPTION OF THE PREFERRED EMBODIMENT

In the drawing, there is shown a transceiver 17, sometimes called a USART, which stands for Universal Synchronous Asynchronous Receiver Transmitter. The USART 17 is shown to have control circuitry 19, a monitored events register 21, a USART status register 23, and a character read register 25. USARTs are well known in the present data communications art and are commercially available. In the preferred embodiment, the USART which is employed is a part number 2661, manufactured by Signetics, but other USARTs could be used. It should be understood that while the monitored events register 21 is shown as being part of the USART, such is shown to purposes of discussion and it need not be part of the USART. In point of fact, in the preferred embodiment the monitored events register 21, which is often referred to as the modem status register, is separate from the commercially available USART, but is considered as part of the overall structure of the transceiver in this discussion. As can be gleaned from the drawing, the transceiver 17 receives signals from a modem through channel 27. The modem which is employed is employed to transform analog-serial signals, coming over a telephone line, or some other communications line, into digital signals to be transmitted into the transceiver 17. The transceiver 17 transforms the digital serial signals into parallel form to be transmitted into the character read register 25. When the modem is connected to the transceiver 17, there are some lines in the connector device which provide steady state signals indicating what some operational conditions of the modem might be. Normally one stage of a modem status register 21 provides a signal which is a "data set ready" signal and this indicates to the system that the modem: is connected to a communication channel, is not in test mode, is not in talk mode, is not in dial mode; and has completed (where applicable) any timing function or tone transmissions associated with call establishment. A second stage of the modem status register provides a signal which is designated the "ring" condition and indicates to the system that a ringing (call alerting) signal is being received on the communication channel. A third stage of the modem status register provides a signal which is designated as the "carrier detect" signal and this provides an indication to the system that the modem is receiving a data signal which meets its suitability criteria. A fourth stage in the modem status register provides a signal which is designated as "clear to send" and this stage indicates to the system that the modem is read to transmit data, while a fifth stage of the modem status register is designated as the "secondary carrier detect" stage and a signal therefrom indicates to the system that the modem is receiving a data signal on its secondary channel (if provided) which meets its suitability criteria. It is very often the case that in a system, which utilizes modem status registers eight bits wide, there will be three stages of the modem status register which are ordinarily unused.

Also designated in the drawing is the USART status register 23 and this register provides flag signals, under the supervision of the control circuitry 19, to indicate that a character has been received in the character read out register 25 and is ready to be read over bus 11, or that the transmitter logic is ready to have another character loaded for transmission. Another stage of the USART status register may provide a flag signal to indicate that the system is operating in a state of synchronization. This flag is often provided as an external pin on the USART and is shown as bistable element 55. The character read register 25 is simply a register which holds eight bits of information which have been shifted in from the input lines 27. The CHR register 25 makes those eight bits ready to be transferred over the bus 11, whenever the proper control signals are provided on the control signal lines of the bus 11.

It should be understood that the control circuitry 19 and the character read register 25, the USART status register 23, and the monitored events register 21, (or the modem status register 21) are all well known and are part of the prior art. Accordingly, their operations need not be set forth in any greater detail than is undertaken in this description because per se, they are not basic to the invention.

There is also shown, in the drawing, a FIFO buffer 29. The FIFO buffer 29 is a well known prior art item, and, in the preferred embodiment is a part number 3341, manufactured by Fairchild Corporation. The role of the FIFO buffer 29 is to accept data words, from data bus 11 along the multiwired channel 31, to be stored in the FIFO. We should consider that the words, which are stored in the FIFO buffer 29, move from left to right as the drawing is viewed, through the multiwire channel 33 to the microprocessor 35. In the drawing, below the FIFO buffer 29, it can be seen that there is shown a scanner 37. The scanner 37 can be any well known counting device, which is operated by a counter drive means or the like and/or which is incremented to provide advancing addresses starting from some first number and ending at some second number and thereafter starting over again at a "home" position or at the first number. Any counter which can be incremented to provide the proper number of bits for a plurality of sequential addresses could be used. The scanner operates to address, in a sequential fashion, each of the transceivers which is connected to bus 11. A second transceiver 39 is shown in phantom and it should be understood that if there are four bits of address information available, that, in all likelihood, there could be 16 terminals or 16 transceivers connected to bus 11.

As is well understood in the data processing art, as the scanner address, eight bits of address information (along the eight bit D/A lines), will be transmitted to each of the transceivers connected to the bus, but only one of those transceivers will be responsive to the combination of ZERO's and ONES's in such an eight bit signal. Actually, in the present system, since there are eight D/A lines available, a first four bits will address, or select, the transceiver while a second four bits are used to select the components which make up the transceiver. Such components could be the monitored events register 21, or the USART status register 23, or character read register 25, or some portion of the control circuitry, depending upon what is to be accomplished. The scanner 37 is designed to first select the transceiver, sometimes called the "line", from which it wishes to receive or to which it wishes to send information, and to select the USART status register 23 associated with that line. While the scanner has thus far been described as a simple counter, in the preferred embodiment additional logic of a known type is employed to permit the scanner to skip the selection of some components if the examination of the USART status register 23 indicated interrogation of those components is unnecessary. If register 23 indicates a "receiver flag", the scanner administers a data transfer over bus 11 to transfer the received character from the character read register 25 to the FIFO 29. If a transmit flag is indicated, logic not shown loads a character for transmission into the transceiver. The important feature is that, whether or not the scanner finds receiver or transmitter flags, the modem status register is always examined as each transceiver is interrogated. With respect to the present invention, the examination of the modem state register is a matter with which we will concern ourselves.

It should also be understood that the scanner 37 transmits its address information to the FIFO buffer 29 so that when a data word is received from a particular transceiver, the address information is entered into the storage position of the FIFO buffer where that data word will be stored. In other words, the address information passes through the FIFO buffer as a tag, or as an identifier, so that when the word is brought from the FIFO buffer into the microprocessor 35, the microprocessor 35 will know from which transceiver, or what "line," that information has come.

The microprocessor 35 can be any well know microprocessor, and, in the preferred embodiment, is a microprocessor of the "bit slice" type implemented with type 2901 IC's manufactured by Advanced Micro Devices Inc. The microprocessor 35 is not per se basic to the present invention (except as it may be part of an overall novel system combination), but is shown and discussed in this description to provide meaning for the utility of the present invention. As can be determined from examination of the drawing, the microprocessor 35 transmits control signals to and from the bus 11 along the multiwired cable 41 and delivers data to a data processor via bus 81.

There is shown in the drawing a RAM 43, which identifies a random access memory. The RAM 43 is connected to the bus 11 to receive information from the D/A lines through the multiwired bus 45. The address information on the four address lines, of course, addresses certain locations in the RAM so that the data information which follows will be stored therein and indexed on a line number basis. Such data information stored in the RAM 43 will be transferred to the register 49.

The output of the RAM 43 is transmitted on the multiwired channels 47 to the register 49. The register 49 is a well known, commercially available, eight bit register, and is designed to hold the data which is read from the RAM 43, so that such data can be compared at the exclusive OR gate 51. The output of the register 49 is transmitted on the multiwired channel 53 to the exclusive OR gate 51 and is continually present at that exclusive OR gate 51 for a comparison with data signals on bus 11.

It should be noted that as part of the control circuit 19, there is shown a flip-flop 55 while in the modem status register 21, there is shown a stage 57. The flip-flop 55 is the "receiver active" or "synchronization achieved" bistable circuit existing within the USART and whose output is available at a USART pin and the empty stage 57 is merely representative of one of the three stages, described earlier, which is not normally used. It should be understood that in the prior art, when a microprocessor, such as the microprocessor 35, is receiving information from a FIFO buffer, such as FIFO buffer 29, the microprocessor is programmed to examine the redundancy check words transmitted at the end of messages. By examining redundancy check words the microprocessor can determine whether or not there has been an irregularity in transmission of data words. When such an irregularity is determined, the microprocessor is programmed to be suspect of the information, or of data words, which has been received into the FIFO buffer after the recognition of the irregularity and before the system reconstitutes itself into a state of synchronization. The irregularity is determined as having come from a particular transceiver and it is the characters from that particular transceiver that are suspect as they are held in the FIFO buffer. To describe the operation another way, if information is being received at the transceiver 17, and is being passed into the FIFO buffer and therethrough, and, at some point in time, the characters being transmitted from the transceiver 17 into the microprocessor are determined to be "out of synchronization," then the microprocessor 35 will generate a signal, which is called a resynchronization request, and transmit that signal over the data bus 11. Actually, the resynchronization request is a command word addressed to the control logic 19 of transceiver 17, whose operation is suspect. The resynchronization request signal is received at the control circuitry 19 and the logic in that control circuitry is manipulated in response to that signal to examine all data words coming in on channel 27, in order to find two consecutive SYNC characters, i.e., two characters with the same combination of ZERO's and ONE's, each of which represents a SYNC signal. The generation of the resynchronization request signal, and the manipulation of the control circuitry 19, is well known in the prior art and no further description of that circuitry or operation need be offered in this description.

When the resynchronization request signal is received by the control circuitry, the generation of receiver flag indications in the USART status register 23 is negated, so that no further information can be dumped into the FIFO buffer. This operation takes place because the system is now suspect of any characters, or data words, which may be received once the system has recognized that data words coming from the transceiver 17, are out of synchronization. The receipt of the resynchronization request signal by control circuitry 19 also resets flip-flop 55 to indicate that the transceiver is no longer active, and that synchronization has been lost. When the flip-flop 55 is reset its low signal is transmitted on the line 59 to be stored in the ordinarily unused register stage 57. It should be understood that prior to the flip-flop 55 being reset, it was in its set condition and hence there was a binary ONE stored in the ordinarily unused stage 57. At the time previous to the microprocessor recognizing the irregularity in the data transmission, the modem status register 21 was interrogated and the condition signals (previously described) were read therefrom onto the bus 11 and transmitted to the RAM 43, as well as to the exclusive OR gate 51. Assume for the moment that at said "time previous" the system was operating in the belief that it was in synchronism, and hence there was a ONE stored in stage 57. The "time previous" reading of the modem status register was transferred to the RAM 43 and was also compared against a prior modem status reading. In both time frames i.e., the time previous" time frame and the prior time thereto, the system considered it was in synchronization, so there was no difference signal resulting from differences in stage 57 transmitted from the exclusive OR gate 51 onto the channel 61.

If we return now to the situation where the microprocessor has recognized the irregularity, there will be a ZERO stored in the stage 57, as just previously described. Further as described, in response to the transceiver 17 having its modem status register interrogated, the signals from the modem status register 21 will be transmitted on the bus 11, to the RAM 43, and to the exclusive OR gate 51. However, at this time, what was previously stored in the RAM, is transferred to the register 49, and hence there is a comparison at the exclusive OR gate 51 of the bit signals from the modem status register, which were present when the system thought that it was in synchronization, with the bits of the modem status register, when the system believed that a resynchronization is being sought. In other words, the bit signal from stage 57 is a ZERO as it appears on the bus 11 while it is a ONE as it appears on the multiwired channel 53 from register 49. The change in the bit status of stage 57 will provide a difference signal from the exclusive OR gate 51 along the cable 61 to the logic circuitry 63. The logic circuitry 63 is present in data communications systems to handle encoding markers for other modem conditions such as "ring" and the conditions described earlier. The present system uses the already present logic circuitry to provide a marker which indicates that there has been a modem change entry. In a preferred embodiment circuitry 63 consists of an octal latch with tristate outputs (in particular a 74S373 manufactured by Texas Instruments Corporation) to store the contents of Cable 61 and an OR gate arrangement (made up of two 74S260's and one 74S00 all of which are manufactured by Texas Instruments Corporation) to detect the presence of a difference signal on Cable 61. The OR gate output alerts the microprocessor 35 that the status of Cable 61 signals should be recorded by means of the octal latch and that the latch should be enabled so as to generate a marker entry into FIFO 29. Now the system will continue to interrogate the remainder of the transceivers, which, in all likelihood, will send characters, or data words, to the FIFO buffer and the marker that we have just described will advance until finally it leaves the FIFO buffer 29 and is transmitted on the cable 33 to the microprocessor 35. The reception of the marker at the microprocessor 35 can be used by the microprocessor in accordance with proper programming to indicate to the microprocessor 35 that the transceiver 17 has received the message to "seek resynchronization." The programmer can arrange to use that marker, so that if a sufficient amount of time passes by, and the microprocessor does not receive a "resynchronization achieved" signal, the system can be programmed to indicate that something is wrong with the transceiver circuitry 17 or the communication line or some other circuitry.

However, if we assume that the transceiver 17 has been manipulated into its "seek resynchronization" mode, and, in fact, does find two sequentially transmitted SYNC signals, then the control circuitry will set the flip-flop 55 and there will be a binary ONE stored in the stage 57. After the ONE is stored in stage 57, and the modem status register is next interrogated, the bits from the modem status register will be transmitted along the signal bus 11 to the exclusive or gate 51, as well as to the RAM 43. However, the bits in the register 49 will be the bits of the modem status register from transceiver 17 as read the prior time, that is during the time when there was an indication (a ZERO bit) in stage 57 that synchronization was being sought. Accordingly, there will be a difference signal from the exclusive OR gate 51, along the lines 61, to the logic circuitry 63. The output of the logic circuitry 63 will be a "modem status change" marker that indicates to the system that synchronization has been achieved. The marker from the logic circuitry 63 is loaded into the data position, along with the address information identifying the transceiver 17. Accordingly, as the system continues to operate, the "synchronization achieved" marker will be advanced through the FIFO buffer and eventually will be transmitted from the FIFO buffer to the microprocessor 35. The microprocessor 35 recognizes the "synchronization achieved" marker and is programmed to accept the data words, or characters, which are received after the "sychronization achieved" marker has been received. It should also be understood that when synchronization is recognized in the control circuitry 19, the assembly of received characters is again enabled and each of the characters is forwarded into the FIFO buffer in its proper turn, in accordance with the scanning operation. Hence there are valid characters in the FIFO buffer following the resynchronization achieved marker.

The present system takes advantage of the fact that the modem status register 21, or the monitored events register, is normally present in some configuration of a transceiver, and that such a register ordinarily has unused stage positions. The present system also takes advantage of the fact that in the control circuitry there is a bistable device, which is reset by a resynchronization request signal and the output of the bistable device provides a bit, or a flag, to be placed in at least one of said unused stage positions in the modem status register. Such a bit is used to be compared against a previously read out bit, with respect to that modem status register, and to recognize a difference or a change, in the modem status. There is a great saving of hardware in employing this system, as compared to other system. In other systems when the microprocessor recognized the irregularity and, in fact, instructed the control signal circuitry 19 to seek synchronization, that same microprocessor worked with other logic circuitry to generate markers and to remind itself through programming that such a marker was in the FIFO buffer and that it, the microprocessor, should be looking for such a marker. The present system provides a simple way to ensure the microprocessor that its message has been received by the transceiver, which feature is not found in the prior art. The present system provides the user with simple circuitry for recognizing when resynchronizatin as been achieved, and therefore at what time, in the reception of the characters, the characters should be considered as valid.

I claim:

1. In a data communication system which includes a transceiver connected to a modem and which transceiver includes control circuity and at least one bistable circuit which bistable circuitry has a first state output signal which indicates that synchronization is being sought and alternatively has a second state output signal which indicates that synchronization has been achieved, a circuit which employs said output signals from said bistable circuit to provide marker signals which indicate the validity of communication data words received by said data communication system, comprising in combination:

multi-stage register means connected to said transceiver and formed to have first stages of said multi-stage register means provide, during each time frame of regularly occurring time frames, system operating condition signals and formed to have at least one second stage available to provide during each of said time frames a binary signal which indicates synchronization being sought and alternatively synchronization achieved; circuitry means connecting said bistable circuit to said at least one second stage to provide said first and second state signals thereto; comparison circuitry means connected to said multi-stage register means to receive said system operating condition signals and said binary signal from said at least one second stage, said comparison circuitry means formed to compare said system operating condition signals and said binary signal of a prior time frame with system operating condition signals and said binary signal of a subsequent time frame whereby if there is a change in said binary signal said comparison circuitry means will provide a change output signal to so indicate; marker signal generator means connected to said comparison circuitry means to receive said change output signal and to generate a marker signal in response thereto.

2. In a data communication system a circuit according to claim 1 wherein said comparison circuitry means includes first and second input signal paths and included in said first input signal path there is a signal delay means which enables said system operating condition signals and said binary signal of a prior time frame to be delayed so that said system operating condition signals and said binary signal of a subsequent time frame can be transmitted along said second input signal path to be compared with said system operating condition signals and said binary signal of a prior time frame.

3. In a data communication system a circuit according to claim 2, wherein said signal delay means includes a signal storage means to store said system operating condition signals and said binary signal of a prior time frame.

4. In a data communication system a circuit according to claim 3 wherein said comparison circuitry means includes an exclusive OR gate means connected to the output of said signal storage means and said second input signal path.

5. In a data communication system a circuit according to claim 1 wherein there is further included FIFO circuitry means connected to said transceiver to receive communication data words from said transceiver and wherein said marker signal generator means is connected to said comparison circuitry means and to said FIFO circuitry means whereby when said comparison circuitry means change output signal indicates a change in said binary signal said marker signal is transmitted to said FIFO circuitry means to accompany a communication data word received by said FIFO circuitry means.

* * * * *